US011367452B2

(12) United States Patent
Chen et al.

(10) Patent No.: US 11,367,452 B2
(45) Date of Patent: Jun. 21, 2022

(54) ADAPTIVE BITRATE CODING FOR SPATIAL AUDIO STREAMING

(71) Applicant: INTEL CORPORATION, Santa Clara, CA (US)

(72) Inventors: Fan Chen, Portland, OR (US); Bo Qiu, Portland, OR (US); Brian E. Woodruff, Portland, OR (US); Peter Sankhagowit, Hillsboro, OR (US); Yunbiao Lin, Shanghai (CN); Wenyi Tang, Beijing (CN); Yongfa Zhou, Beijing (CN); Jianwei Yang, Beijing (CN); Jianfang Zhu, Hillsboro, OR (US); Priya Balasubramanian, Beaverton, OR (US); Ashish Singhi, Portland, OR (US); Yating Wang, Beijing (CN); Yu Y Yang, Beijing (CN); Areeba Turabi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 16/765,023

(22) PCT Filed: Mar. 2, 2018

(86) PCT No.: PCT/CN2018/077897
§ 371 (c)(1),
(2) Date: May 18, 2020

(87) PCT Pub. No.: WO2019/165642
PCT Pub. Date: Sep. 6, 2019

(65) Prior Publication Data
US 2020/0365163 A1  Nov. 19, 2020

(51) Int. Cl.
*G10L 19/002* (2013.01)
*G02B 27/00* (2006.01)
(Continued)

(52) U.S. Cl.
CPC ........ *G10L 19/002* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS

| 2002/0090094 A1* | 7/2002 | Amir | H04R 3/00 381/92 |
| 2008/0056517 A1* | 3/2008 | Algazi | H04S 7/304 381/310 |

(Continued)

FOREIGN PATENT DOCUMENTS

| CN | 103052984 A | 4/2013 |
| WO | 2019165642 A1 | 9/2019 |

OTHER PUBLICATIONS

International Search Report and Written Opinion received for PCT Application No. PCT/CN2018/077897. dated Nov. 26, 2018. 9 pages.

(Continued)

*Primary Examiner* — Antim G Shah
(74) *Attorney, Agent, or Firm* — Hanley, Flight & Zimmerman, LLC

(57) ABSTRACT

Techniques are provided for spatial audio streaming using adaptive bitrate encoding and decoding in bandwidth limited virtual reality applications. A methodology implementing the techniques according to an embodiment includes calculating weight factors for audio channels associated with each of a plurality of microphones. The weight factors are based on the position and head angle, relative to the microphones, of a user wearing a head mounted display (HMD). The method also includes encoding and decoding the audio channels, for transmission to the HMD, at a selected bitrate, (Continued)

the bitrate based on the weight factor for the audio channel. The method further includes applying an adaptive gain compensation to each of the received and decoded audio channels, the gain compensation also based on the weight factor. The method further includes mixing the resulting gain compensated channels to generate a stereo audio signal to be played through speakers of the HMD.

20 Claims, 8 Drawing Sheets

(51) Int. Cl.

| | | |
|---|---|---|
| *G02B 27/01* | (2006.01) | |
| *G06F 3/01* | (2006.01) | |
| *G06T 19/00* | (2011.01) | |
| *H04R 3/00* | (2006.01) | |
| *H04R 3/04* | (2006.01) | |
| *H04R 5/033* | (2006.01) | |
| *H04R 5/04* | (2006.01) | |
| *H04S 1/00* | (2006.01) | |
| *H04S 7/00* | (2006.01) | |

(52) U.S. Cl.
CPC .............. *G06F 3/012* (2013.01); *G06F 3/017* (2013.01); *G06T 19/006* (2013.01); *H04R 3/005* (2013.01); *H04R 3/04* (2013.01); *H04R 5/033* (2013.01); *H04R 5/04* (2013.01); *H04S 1/005* (2013.01); *H04S 7/304* (2013.01); *H04S 7/307* (2013.01)

(56) References Cited

U.S. PATENT DOCUMENTS

| | | |
|---|---|---|
| 2012/0173247 A1 | 7/2012 | Sung et al. |
| 2016/0035357 A1 | 2/2016 | Vasilache et al. |
| 2016/0255348 A1 | 9/2016 | Panchagnula et al. |
| 2019/0335287 A1* | 10/2019 | Jung ............... H04N 7/157 |

OTHER PUBLICATIONS

International Preliminary Report on Patentability dated Sep. 17, 2020 for International Patent Application No. PCT/CN2018/077897, 5 pages.

* cited by examiner

ADAPTIVE BITRATE CODING FOR SPATIAL AUDIO STREAMING

BACKGROUND

Virtual reality (VR) systems attempt to immerse the user in a virtual environment that is consistent and realistically convincing in all perceived sensations. While much attention has been paid to improving the visual quality of the VR experience, the audio quality is also very important. Current high-fidelity VR systems may stream spatial audio from a remote location to the head mounted display (HMD) worn by a local user, employing up to 25 audio channels at relatively high data rates that are comparable to video data rates. This poses significant challenges on communication networks which are generally bandwidth limited. Existing systems typically address this problem by either reducing the number of audio channels or by degrading the quality of each audio stream to reduce data rates. These approaches result in degraded audio quality and an unsatisfactory and less realistic user experience.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
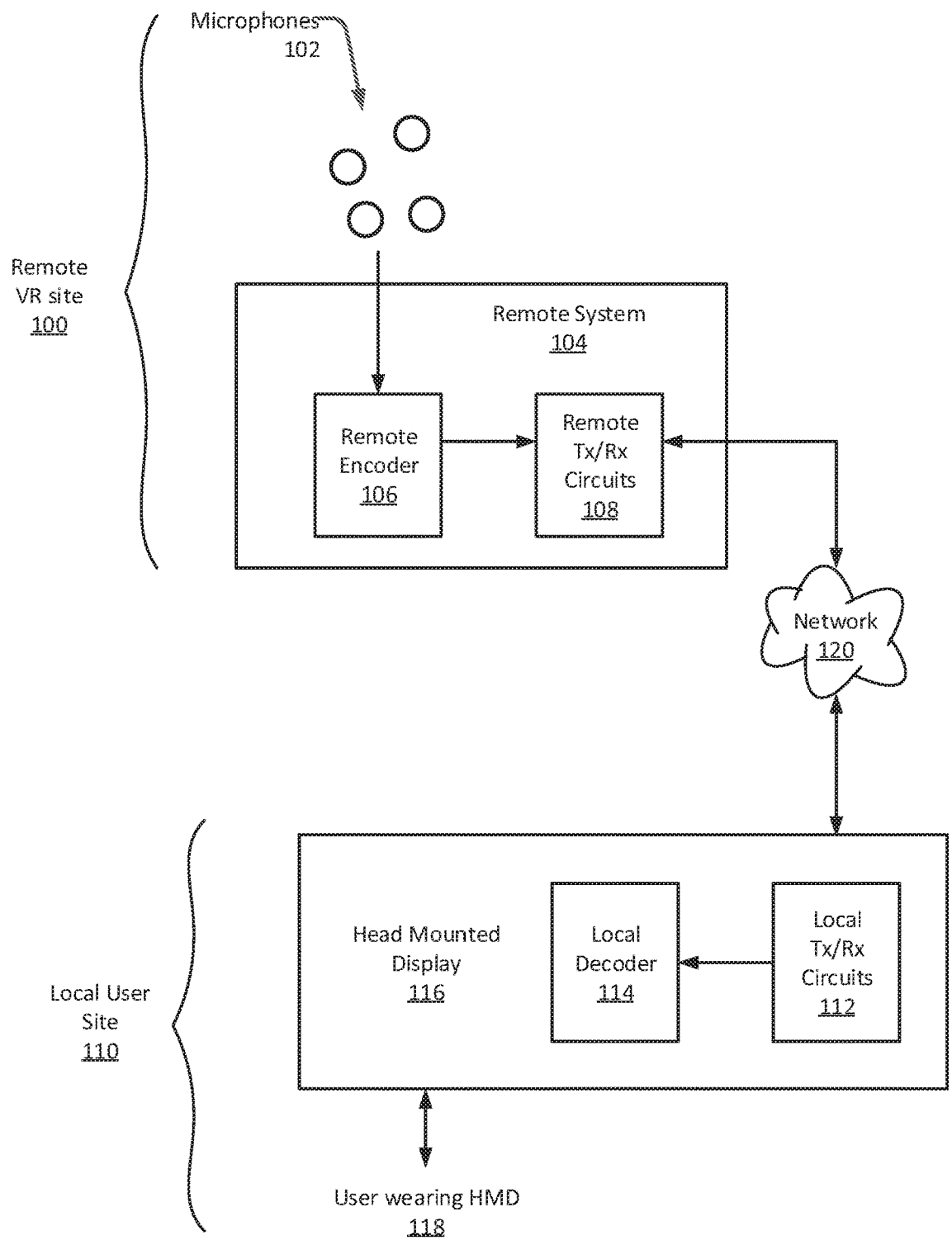
FIG. 1 is a top-level diagram of an adaptive bitrate coding system for spatial audio streaming in a virtual reality (VR) application, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for improved spatial audio streaming using adaptive bitrate encoding and decoding. The disclosed techniques allow for higher fidelity audio reproduction in bandwidth limited virtual reality (VR) applications, by allocating bandwidth to audio channels based on a dynamic evaluation of their relative value to the VR experience. In some embodiments, a channel of greater relative value is encoded at a higher bitrate (e.g., data transmission rate). The relative value of each channel is estimated based on a model of the directional sensitivity of human hearing applied to updated measurements of the position and head angle of the user relative to the microphones. Additionally, in some embodiments, adaptive gain compensation is performed during mixing of the audio channels, to generate a stereo representation for playback through the head mounted display (HMD) worn by the user. The gain compensation places increased emphasis on channels of greater relative value.

The disclosed techniques can be implemented, for example, in a computing system or a software product executable or otherwise controllable by such systems, although other embodiments will be apparent. The system or product is configured to provide for spatial audio streaming using adaptive bitrate encoding and decoding. In accordance with an embodiment, a methodology to implement these techniques includes calculating weight factors for audio channels associated with microphones located at a VR site that is remote from the user. The weight factors are based on the position and head angle, relative to the microphones, of a user wearing an HMD. The weight factors reflect the relative directional sensitivity of the human ear. The method further includes encoding the audio channels, for transmission from the remote site to the HMD, at a selected bitrate which is based on the weight factor for the audio channel. Thus, channels that are of greater importance, based on directional sensitivity, may be encoded at higher bitrates relative to other channels. The audio channels are received at the HMD and decoded at the associated bitrate. The method further includes applying an adaptive gain compensation to each of the received and decoded audio channels. The gain compensation is also based on the weight factor. The method further includes mixing the resulting gain compensated channels to generate a stereo audio signal to be played through speakers of the HMD.

As will be appreciated, the techniques described herein may allow for increased audio fidelity and provide an improved virtual reality experience for the user, by utilizing available bandwidth with greater efficiency, compared to existing methods that limit the number of audio channels and/or the bitrate of each channel. The disclosed techniques can be implemented on a broad range of platforms including personal computers, workstations, laptop computers, tablets, smartphones, wearable devices, embedded systems, and so forth, in combination with a head mounted display. These techniques may further be implemented in hardware or software or a combination thereof. Numerous applications that call for or otherwise entail audio transmissions or communication between a computing platform and a user, or between participants in a VR application or game, can benefit from the techniques provided, as will be appreciated.

FIG. 1 is a top-level diagram of an adaptive bitrate coding system for spatial audio streaming in a virtual reality (VR) application, configured in accordance with certain embodiments of the present disclosure. The figure shows a local user site 110 and a remote VR site 100 linked through a network 120. The terms "local" and "remote" are intended to indicate locations relative to the user of the VR application and do not imply any specific measure of distance. The network 120 may be any suitable network, wired or wireless, including, for example, a local area network, a wide area network, and/or the Internet. The user 118 is located at the local user site 110 and is shown to wear a head mounted display 116 which is configured to provide a VR experience that includes audio, visual, and in some embodiments, other sensory stimulations, which may be captured or otherwise generated at the remote VR site 100. The effect created by the system is to project the user, who is physically located at site 110, into a virtual reality experience at remote site 100. The user is thus able to rotate his or her head freely, with minimal delay (e.g., less than 20 milliseconds) to experience and explore the remote environment as if he or she is physically present at the remote site where the audio and video is being captured. In some embodiments, the audio and video capturing devices can be installed in a fixed or stationary configuration, or on a mobile rig.

Audio is captured at the remote VR site 100 through an array of microphones or other suitable audio recording devices 102 which may be deployed in any desired configuration or arrangement. Each microphone is associated with an audio channel and in some embodiments, there may be 25 or more audio channels to provide a realistic high-fidelity VR experience. Remote system 104 is shown to include a remote encoder 106 and remote transmit/receive (Tx/Rx) circuits 108. At a high level, remote encoder 106 is configured to encode each of the audio channels at an adaptive bitrate, for transmission through Tx/Rx circuits 108, to more efficiently utilize the bandwidth of network 120, as will be described in greater detail below.

HMD 116 is shown to include local decoder 114 and local Tx/Rx circuits 112. Local Tx/Rx circuits 112 are configured to receive the encoded audio channels through network 120. Local decoder 114 is configured to decode each of the audio channels at the adaptive bitrate that was employed by remote encoder 106, as will be described in greater detail below.

In some embodiments visual data is also captured through cameras at the remote VR site, and other sensory data may also be captured through suitable sensors at the remote VR site, for transmission back through the network 120 to the HMD 116, using suitable compression techniques in light of the present disclosure.

Figure 2:
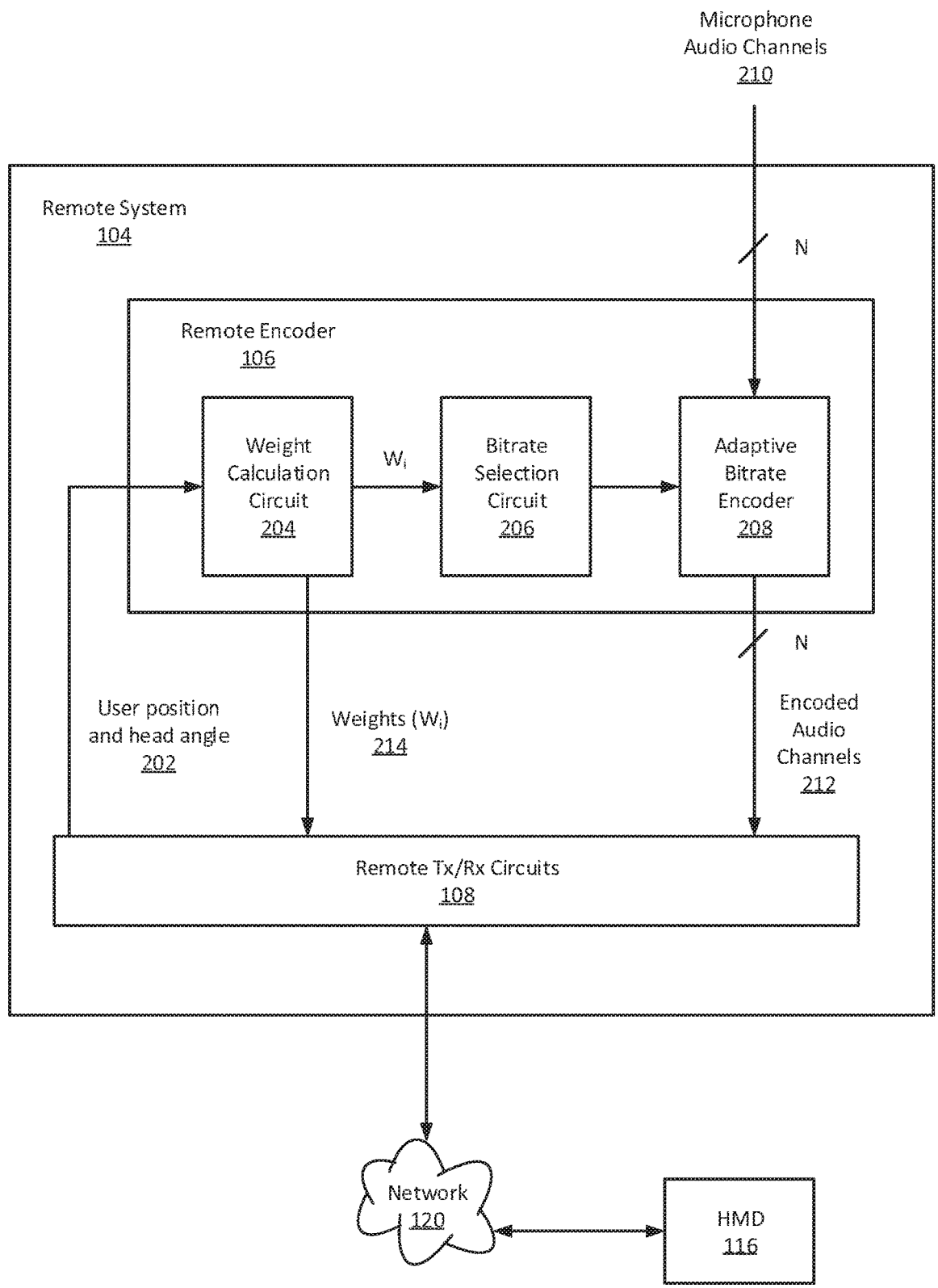
FIG. 2 is a block diagram of the remote system component of the VR application, configured in accordance with certain embodiments of the present disclosure.

FIG. 2 is a block diagram of the remote system component 104 of the VR application, configured in accordance with certain embodiments of the present disclosure. The remote system 104 is shown to include remote encoder 106 and remote Tx/Rx circuits 108. Remote encoder 106 is further shown to include weight calculation circuit 204, bitrate selection circuit 206, and adaptive bitrate encoder 208.

The weight calculation circuit 204 is configured to calculate weight factors 214 for each of the N microphones 102, and associated audio channels 210. The N weight factors 214 are based on the position and head angle, relative to that microphone, of the user wearing the HMD, as the user is projected (virtually) from the local site 110 into the remote site 100, as shown in FIG. 4 and discussed below. As the user moves about to explore the VR environment, the weight factors are dynamically updated. In some embodiments, the position and head angle are received through remote Tx/Rx circuits 108, from the HMD 116.

In some embodiments, the weight calculation circuit is configured to calculate a distance between the virtual location of the user and each of the microphones, based on the reported position of the user. The weight factor may be calculated to be inversely proportional to the square of the distance. The weight factor may further be based on a measured or estimated directional sensitivity 500 of the human ear associated with the given head angle, as shown for example in FIG. 5, and discussed below. In some embodiments, for example, the N weight factors may be calculated according to the following equation:

$$w_i = \frac{DirSens(\theta_i)\exp\left(-\frac{d_i^2}{2\sigma^2}\right)}{\sum_i DirSens(\theta_i)\exp\left(-\frac{d_i^2}{2\sigma^2}\right)}$$

where $w_i$ is the weight factor for microphone i, $d_i$ is the distance from the user to microphone i, $\theta_i$ is the relative head angle between the front facing direction of the user and microphone i, and DirSens is the directional sensitivity 500 associated with that angle. Additionally, in this equation, $\sigma$ is an adjustable parameter that can be set based on microphone characteristics and the spatial size of the remote VR site. The value of this parameter can be selected to trade-off between bitrate reduction and audio quality.

The bitrate selection circuit 206 is configured to select encoding bitrates based on the weight factors. Audio channels associated with lower weight factors may generally be transmitted at reduced bitrates since they have a lower relevance or value to the VR experience, and so the reduced quality associated with a reduced bitrate will have less impact on the user. In some embodiments, the bitrate selection may be accomplished, for example, by employing a lookup table, or other suitable mechanism, to map one or more ranges of weight factor values to associated encoding bitrates. So, for example, if the weight factors are normalized to the range of 0.0 to 1.0, then weight factors in the range of 0.75 to 1.0 might be mapped to 128K bits per second while weight factors in the range of 0.0 to 0.25 might be mapped to 32K bits per second.

The adaptive bitrate encoder 208 is configured to encode the N audio channels at the selected bitrates. Any suitable encoding technique may be employed, in light of the present disclosure. In some embodiments, the encoded audio channels 212 are transmitted over network 120 to the HMD 116, through remote Tx/Rx circuits 108.

Figure 3:
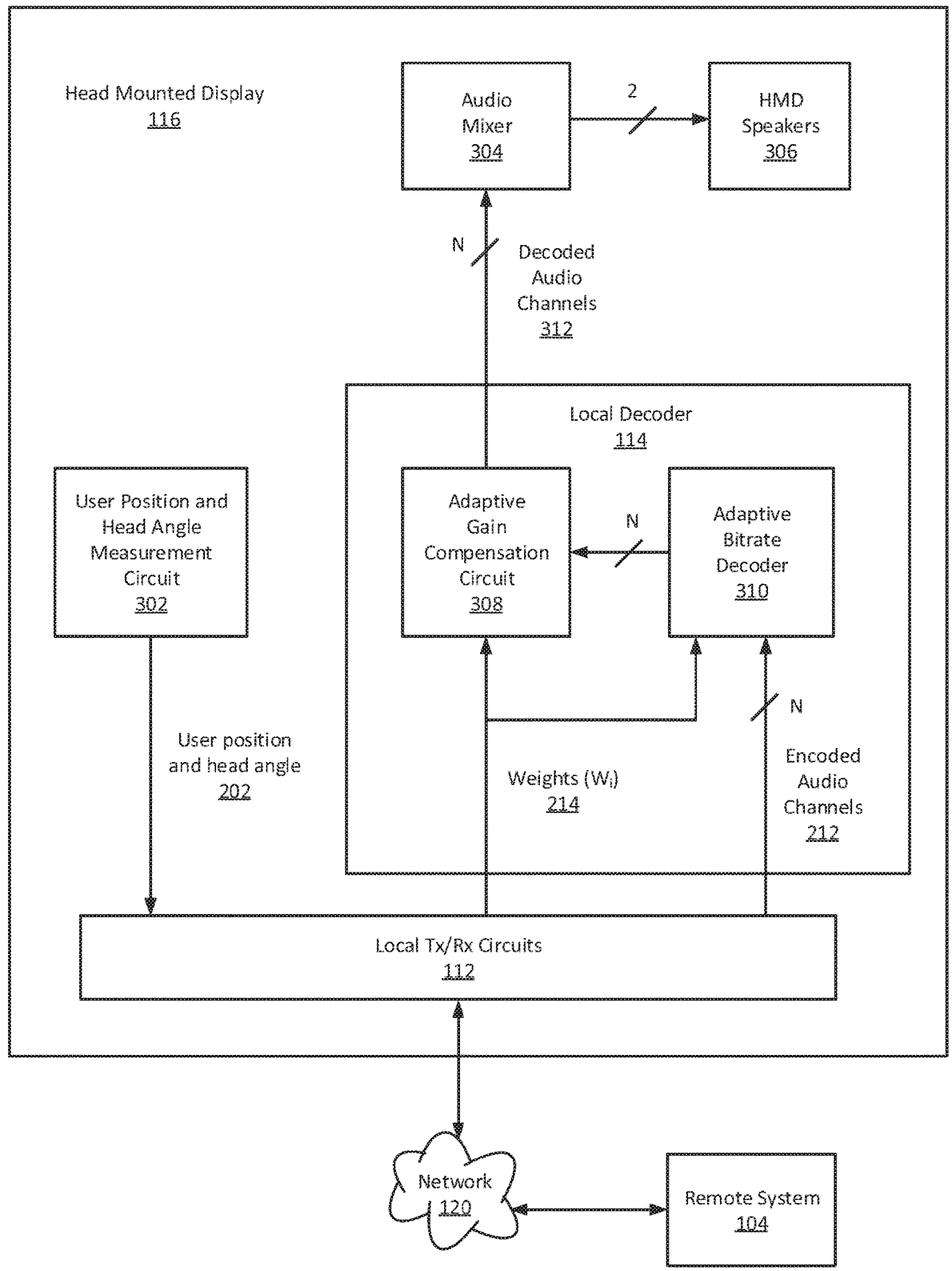
FIG. 3 is a block diagram of the head mounted display (HMD) component of the VR application, configured in accordance with certain embodiments of the present disclosure.

FIG. 3 is a block diagram of the head mounted display (HMD) component 116 of the VR application, configured in accordance with certain embodiments of the present disclosure. The HMD 116 is shown to include local Tx/Rx circuits 112, adaptive bitrate decoder circuit 310, adaptive gain compensation circuit 308, audio mixer 304, user position and head angle measurement circuit 302, and speakers 306.

The local Tx/Rx circuits 112 are configured to receive the N encoded audio channels 212, for example over network 120. The channels 212 have been encoded at selected bitrates, by remote system 104, based on the position and head angle of the user relative to the microphones 102 at the remote VR site 100.

The adaptive bitrate decoder circuit 310 is configured to decode each of the audio channels at the bitrate associated with that channel. Any suitable decoding technique may be employed, in light of the present disclosure.

The adaptive gain compensation circuit 308 is configured to scale the N decoded audio channels by a gain factor (or attenuation factor) which is also based on the weight factor 214, and thus on the position and head angle of the user relative to the associated microphone. Audio channels associated with lower weight factors generally have a lower relevance or value to the VR experience, and so may be scaled down, while audio channels with higher weight factors and greater relevance may be scaled up. In some embodiments, the selection of gain factors may be accomplished, for example, by employing a lookup table, or other suitable mechanism, to map one or more ranges of weight factor values to desired gain factors.

The audio mixer 304 is configured to combine the scaled decoded audio channels to generate a stereo audio signal (e.g., 2 channels) to be played through speakers 306 of the HMD. For example, in some embodiments, audio channels associated with microphones on the left side of the user's head may be combined to generate the left stereo signal, while audio channels associated with microphones on the right side of the user's head may be combined to generate the right stereo signal.

The user position and head angle measurement circuit 302 is configured to generate and update the position and head angle of the user, as the user and the HMD move about the local site 110. In some embodiments, the position and head angle are transmitted through local Tx/Rx circuits 112, to remote system 104 for use by the weight calculation circuit 204. In some embodiments, the weight calculations may be performed at the HMD 116 and then transmitted to the remote system 104, for example, in place of the position and head angle.

Figure 4A:
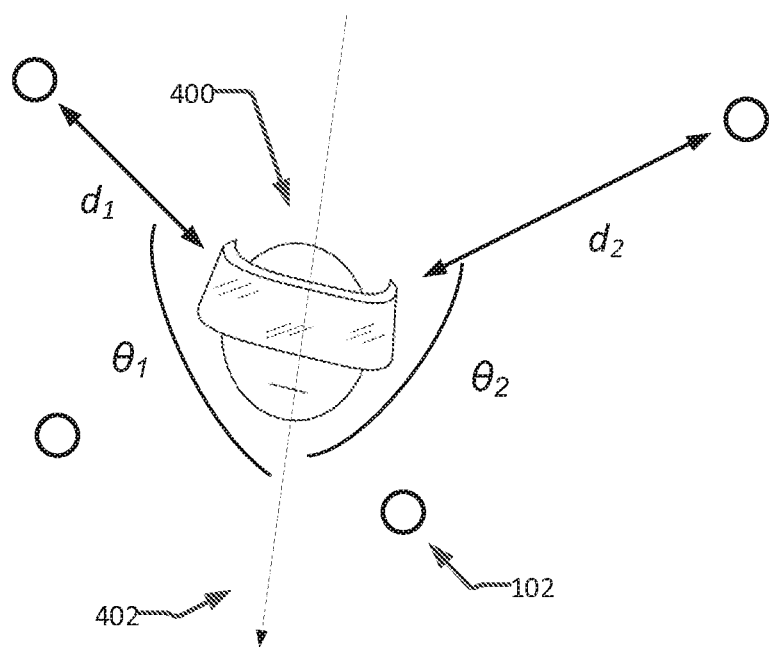
FIGS. 4A and 4B illustrate spatial relationships between the user HMD and an array of microphones, in accordance with certain embodiments of the present disclosure.
Figure 4B:
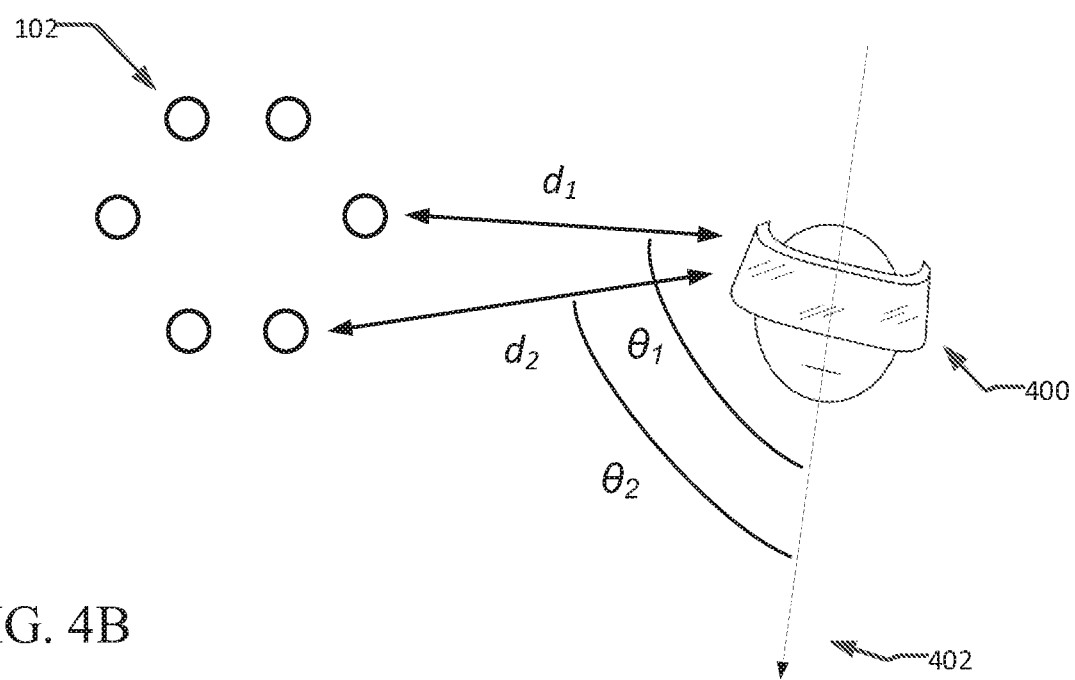

FIGS. 4A and 4B illustrate spatial relationships between the user HMD and an array of microphones, in accordance with certain embodiments of the present disclosure. A user wearing an HMD 400 is shown to be projected into the remote VR site 100 with an orientation that is facing in a forward direction along the dotted line 402. In the example illustrated in FIG. 4A, the user is surrounded by four microphones 102. The distances $d_1$, $d_2$, and angles $\theta_1$, $\theta_2$, to two of those microphones are illustrated, where the angles are shown to be relative to the forward-facing direction 402. FIG. 4B illustrates another example where an array of six microphones 102 is located to one side of the user. Again, the distances $d_1$, $d_2$, and angles $\theta_1$, $\theta_2$, to two of those microphones are illustrated, where the angles are shown to be relative to the forward-facing direction 402.

Figure 5:
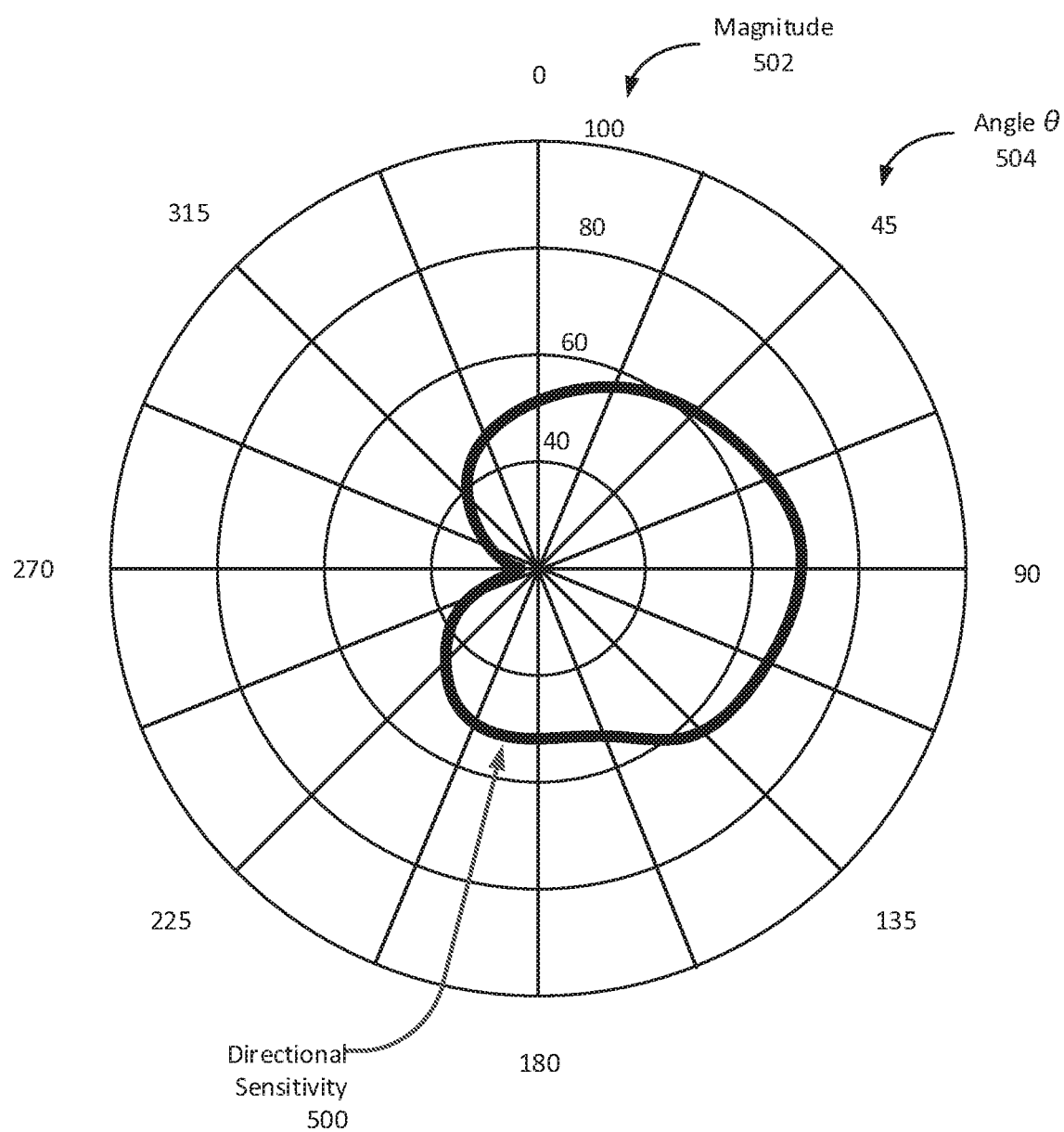
FIG. 5 is a plot of audio directional sensitivity associated with a human ear, in accordance with certain embodiments of the present disclosure.

FIG. 5 is a plot of audio directional sensitivity 500 associated with a human ear, in accordance with certain embodiments of the present disclosure. The directional sensitivity 500 is shown over a range of angles 504 from 0 to 360° for a right human ear. The magnitude 502, in this example reaches a maximum value at about 90°, which is the perpendicular direction to the right ear, where 0° is the forward-facing angle of the human head. These directional sensitivity values may be experimentally measured, estimated, or otherwise obtained through any suitable method, for use in the weight factor calculation as described previously.

Methodology

Figure 6:
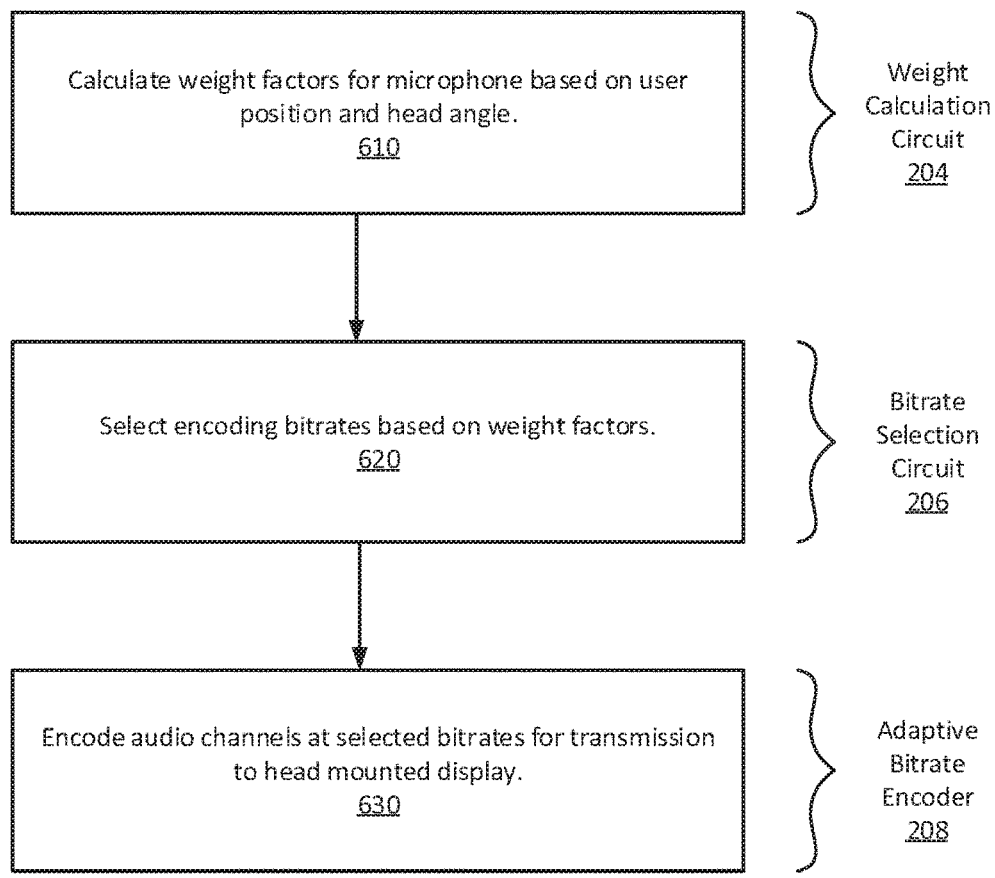
FIG. 6 is a flowchart illustrating a methodology for adaptive bitrate encoding, in accordance with certain embodiments of the present disclosure.
Figure 7:
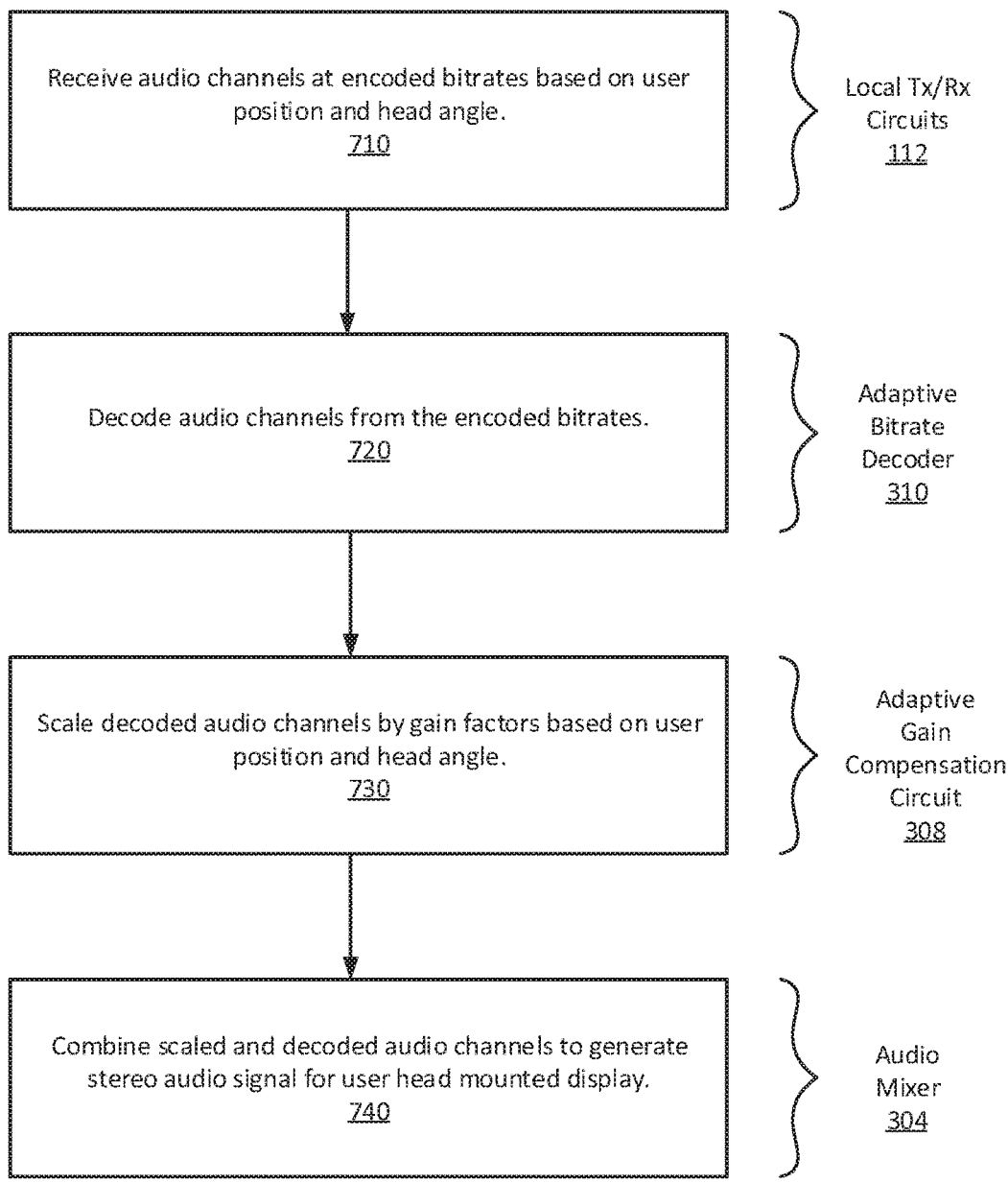
FIG. 7 is a flowchart illustrating a methodology for adaptive bitrate decoding, in accordance with certain embodiments of the present disclosure.

FIGS. 6 and 7 are flowcharts illustrating example methods 600 and 700 for adaptive bitrate encoding and decoding in bandwidth limited virtual reality applications, in accordance with certain embodiments of the present disclosure. As can be seen, the example methods include a number of phases and sub-processes, the sequence of which may vary from one embodiment to another. However, when considered in the aggregate, these phases and sub-processes form a process for adaptive bitrate coding, in accordance with certain of the embodiments disclosed herein. These embodiments can be implemented, for example using the system architecture illustrated in FIGS. 1-3, as described above. However other system architectures can be used in other embodiments, as will be apparent in light of this disclosure. To this end, the correlation of the various functions shown in FIGS. 6 and 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of methods 600 and 700. Thus, other embodiments may have fewer or more modules and/or sub-modules depending on the granularity of implementation. In still other embodiments, the depicted methodologies can be implemented as a computer program product including one or more non-transitory machine-readable mediums that when executed by one or more processors cause the methodologies to be carried out. Numerous variations and alternative configurations will be apparent in light of this disclosure.

As illustrated in FIG. 6, in an embodiment, method 600 for adaptive bitrate encoding, for example at the remote VR site, commences by calculating, at operation 610, weight factors to be associated with each microphone (and audio channel). Each weight factor is based on the position and the head angle of the user wearing the HMD relative to the associated microphone. A position closer to the microphone will generally be associated with a higher valued weight factor for that microphone. Additionally, the head angle relative to the microphone will contribute to the scaling of the weight factor for that microphone based on the directional sensitivity of the human ear.

Next, at operation 620, encoding bitrates are selected for each channel based on the weight factors. Higher valued weight factors may typically be associated with higher bitrates. At operation 630, each audio channel is encoded at the selected bitrate for transmission back to the HMD. As the user moves around, the weight factors, and thus the bitrates, are updated based on new measurements of position and head angle, allowing for adaptive bitrate encoding.

Of course, in some embodiments, additional operations may be performed, as previously described in connection with the system. For example, the user's head angle and position may be transmitted from the HMD to the remote system at the VR site over any suitable network connection. Similarly, the encoded audio channels may be transmitted from the remote system back to the HMD over the network connection, which may be bandwidth limited.

As illustrated in FIG. 7, in an embodiment, method 700 for adaptive bitrate decoding, for example at the HMD, commences by receiving, at operation 710, the audio channels which were encoded at bitrates that are based on user position and head angle relative to the associated microphones (e.g., using the weight factors). Next, at operation 720, the audio channels are decoded from the encoded bitrates.

At operation 730, the decoded audio channels are scaled by gain factors that are based on user position and head angle relative to the associated microphones (e.g., using the weight factors). At operation 740, the scaled and decoded audio channels are combined, or mixed, to generate a stereo audio signal that may be played through speakers in the user's HMD.

Of course, in some embodiments, additional operations may be performed, as previously described in connection with the system. For example, the position and head angle of the user may be measured and dynamically updated as the user moves around, and this information may be transmitted to the remote system at the VR site for use in the calculation of the weight factors.

Example System

Figure 8:
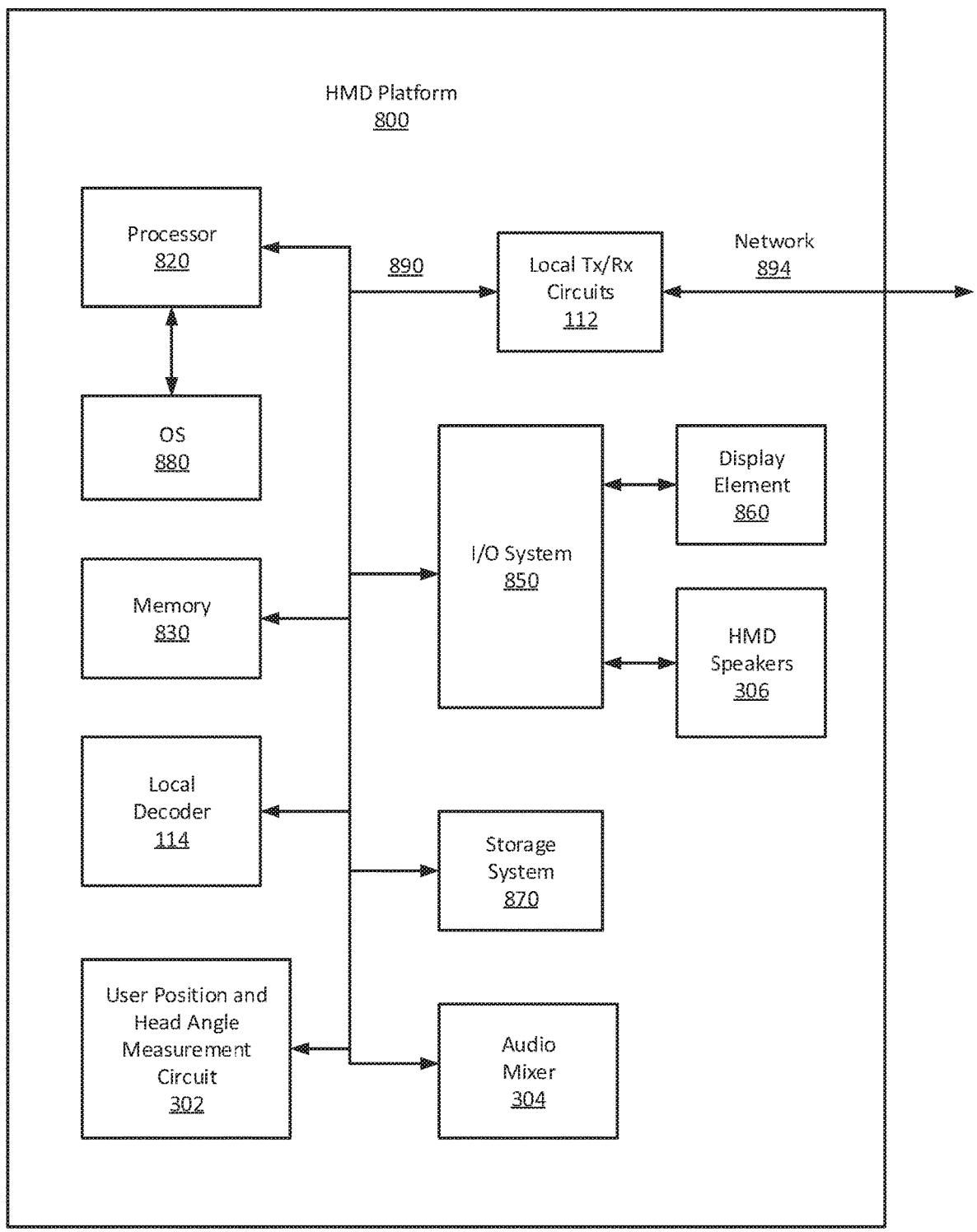
FIG. 8 is a block diagram schematically illustrating an HMD platform configured to perform adaptive bitrate decoding, in accordance with certain embodiments of the present disclosure.

FIG. 8 illustrates an example HMD platform 800 to provide spatial audio streaming with adaptive bitrate decoding in VR applications, configured in accordance with certain embodiments of the present disclosure. In some embodiments, platform 800 may host, or otherwise be incorporated into a personal computer, workstation, laptop computer, tablet, smartphone, wearable device, embedded system, and so forth, in combination with a head mounted display. Any combination of different devices may be used in certain embodiments.

In some embodiments, platform 800 may comprise any combination of a processor 820, a memory 830, a language understanding system 100, a network interface 840, an input/output (I/O) system 850, local decoder 114, user position and head angle measurement circuit 302, audio mixer 304, and a storage system 870. As can be further seen, a bus and/or interconnect 890 is also provided to allow for communication between the various components listed above and/or other components not shown. Platform 800 can be coupled to a network 894 through local transmit/receive circuits (e.g., network interface) 112 to allow for communications with remote VR site system 104, other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Local Tx/Rx circuits 112 can be any appropriate network chip or chipset which allows for wired and/or wireless connection between other components of platform 800 and/or network 894, thereby enabling platform 800 to communicate with remote system 104, other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of platform 800. I/O devices may include, but not be limited to, HMD display element 860 and HMD speakers 306. I/O system 850 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, the various components of the platform 800 may be combined or integrated in a system-on-a-chip (SoC) architecture. In some embodiments, the components may be hardware components, firmware components, software components or any suitable combination of hardware, firmware or software.

Local decoder 114 is configured to provide adaptive bitrate decoding in bandwidth limited VR applications to provide spatial audio streaming from a remote component of the VR system, as described previously. Local decoder 114 may include any or all of the circuits/components illustrated in FIGS. 1-3, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In some embodiments, these circuits may be installed local to platform 800, as shown in the example embodiment of FIG. 8. Alternatively, platform 800 can be implemented in a client-server arrangement wherein at least some functionality associated with these circuits is provided to platform 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the adaptive bitrate coding methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other audio and/or visual based applications, such as, for example, automobile control/navigation, smart-home management, entertainment, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a system for adaptive bitrate encoding, the system comprising: a weight calculation circuit to calculate a first weight factor associated with a first microphone, and to calculate a second weight factor associated with a second microphone, each of the first and second weight factors based on a position and a head angle of a user relative to the first and second microphones; a bitrate selection circuit to select a first encoding bitrate based on the first weight factor, and to select a second encoding bitrate based on the second weight factor; and an adaptive bitrate encoder circuit to encode a first audio channel, associated with the first microphone, at the first encoding bitrate, and to encode a second audio channel, associated with the second microphone, at the second encoding bitrate.

Example 2 includes the subject matter of Example 1, further comprising a receiver circuit to receive the position of the user and the head angle of the user, from a head mounted display (HMD) worn by the user.

Example 3 includes the subject matter of Examples 1 or 2, further comprising a transmitter circuit to transmit the encoded first audio channel and the encoded second audio channel to an HMD worn by the user.

Example 4 includes the subject matter of any of Examples 1-3, wherein the weight calculation circuit is further to calculate a distance between the user and the first microphone based on the position of the user, and the first weight factor is inverse exponentially proportional to the square of the distance.

Example 5 includes the subject matter of any of Examples 1-4, wherein the weight calculation circuit is further to calculate the first weight factor based on a directional sensitivity of a human ear associated with the head angle of the user.

Example 6 is a system for adaptive bitrate decoding, the system comprising: a receiver circuit to receive a first audio channel encoded at a first bitrate, and to receive a second audio channel encoded at a second bitrate, each of the first and second bitrates based on a position and a head angle of a user relative to a first and a second microphone; an adaptive bitrate decoder circuit to decode the first audio channel at the first bitrate, and to decode the second audio channel at the second bitrate; an adaptive gain compensation circuit to scale the decoded first audio channel by a first gain factor, and to scale the decoded second audio channel by a second gain factor, each of the first and second gain factors based on the position and the head angle of the user relative to the first and the second microphone; and an audio mixer to combine the scaled decoded first audio channel and the scaled decoded second audio channel to generate a stereo audio signal.

Example 7 includes the subject matter of Example 6, wherein the system is a head mounted display (HMD) worn by the user, and the stereo audio signal is played through speakers of the HMD.

Example 8 includes the subject matter of Examples 6 or 7, further comprising a measurement circuit to generate the position and the head angle of the user as the user moves the HMD.

Example 9 includes the subject matter of any of Examples 6-8, further comprising a transmitter circuit to transmit the position and the head angle to a remote adaptive bitrate encoding system associated with the first and the second microphone.

Example 10 includes the subject matter of any of Examples 6-9, wherein the system is a virtual reality system to present audio and video to the user through the HMD, the audio and video provided from the remote adaptive bitrate encoding system.

Example 11 is at least one non-transitory computer readable storage medium having instructions encoded thereon that, when executed by one or more processors, result in the following operations for adaptive bitrate encoding, the operations comprising: calculating a first weight factor associated with a first microphone, and calculating a second weight factor associated with a second microphone, each of the first and second weight factors based on a position and a head angle of a user relative to the first and second microphones; selecting a first encoding bitrate based on the first weight factor, and selecting a second encoding bitrate based on the second weight factor; and encoding a first audio channel, associated with the first microphone, at the first encoding bitrate, and encoding a second audio channel, associated with the second microphone, at the second encoding bitrate.

Example 12 includes the subject matter of Example 11, further comprising the operation of receiving the position of the user and the head angle of the user, from a head mounted display (HMD) worn by the user.

Example 13 includes the subject matter of Examples 11 or 12, further comprising the operation of transmitting the encoded first audio channel and the encoded second audio channel to an HMD worn by the user.

Example 14 includes the subject matter of any of Examples 11-13, further comprising the operation of calculating a distance between the user and the first microphone based on the position of the user, and the first weight factor is inverse exponentially proportional to the square of the distance.

Example 15 includes the subject matter of any of Examples 11-14, further comprising the operation of calculating the first weight factor based on a directional sensitivity of a human ear associated with the head angle of the user.

Example 16 is at least one non-transitory computer readable storage medium having instructions encoded thereon that, when executed by one or more processors, result in the following operations for adaptive bitrate decoding, the operations comprising: receiving a first audio channel encoded at a first bitrate, and receiving a second audio channel encoded at a second bitrate, each of the first and second bitrates based on a position and a head angle of a user relative to a first and a second microphone; decoding the first audio channel at the first bitrate, and decoding the second audio channel at the second bitrate; scaling the decoded first audio channel by a first gain factor, and scaling the decoded second audio channel by a second gain factor, each of the first and second gain factors based on the position and the head angle of the user relative to the first and the second microphone; and combining the scaled decoded first audio channel and the scaled decoded second audio channel to generate a stereo audio signal.

Example 17 includes the subject matter of Example 16, further comprising the operation of playing the stereo audio signal through speakers of a head mounted display (HMD) worn by the user.

Example 18 includes the subject matter of Examples 16 or 17, further comprising the operation of generating the position and the head angle of the user as the user moves the HMD.

Example 19 includes the subject matter of any of Examples 16-18, further comprising the operation of transmitting the position and the head angle to a remote adaptive bitrate encoding system associated with the first and the second microphone.

Example 20 includes the subject matter of any of Examples 16-19, wherein the HMD is a virtual reality system to present audio and video to the user, the audio and video provided from the remote adaptive bitrate encoding system.

Example 21 is a method for adaptive bitrate encoding, the method comprising: calculating a first weight factor associated with a first microphone, and calculating a second weight factor associated with a second microphone, each of the first and second weight factors based on a position and a head angle of a user relative to the first and second microphones; selecting a first encoding bitrate based on the first weight factor, and selecting a second encoding bitrate based on the second weight factor; and encoding a first audio channel, associated with the first microphone, at the first encoding bitrate, and encoding a second audio channel, associated with the second microphone, at the second encoding bitrate.

Example 22 includes the subject matter of Example 21, further comprising receiving the position of the user and the head angle of the user, from a head mounted display (HMD) worn by the user.

Example 23 includes the subject matter of Examples 21 or 22, further comprising transmitting the encoded first audio channel and the encoded second audio channel to an HMD worn by the user.

Example 24 includes the subject matter of any of Examples 21-23, further comprising calculating a distance between the user and the first microphone based on the position of the user, and the first weight factor is inverse exponentially proportional to the square of the distance.

Example 25 includes the subject matter of any of Examples 21-24, further comprising calculating the first weight factor based on a directional sensitivity of a human ear associated with the head angle of the user.

Example 26 is a method for adaptive bitrate decoding, the method comprising: receiving a first audio channel encoded at a first bitrate, and receiving a second audio channel encoded at a second bitrate, each of the first and second bitrates based on a position and a head angle of a user relative to a first and a second microphone; decoding the first audio channel at the first bitrate, and decoding the second audio channel at the second bitrate; scaling the decoded first audio channel by a first gain factor, and scaling the decoded second audio channel by a second gain factor, each of the first and second gain factors based on the position and the head angle of the user relative to the first and the second microphone; and combining the scaled decoded first audio channel and the scaled decoded second audio channel to generate a stereo audio signal.

Example 27 includes the subject matter of Example 26, further comprising playing the stereo audio signal through speakers of a head mounted display (HMD) worn by the user.

Example 28 includes the subject matter of Examples 26 or 27, further comprising generating the position and the head angle of the user as the user moves the HMD.

Example 29 includes the subject matter of any of Examples 26-28, further comprising transmitting the position and the head angle to a remote adaptive bitrate encoding system associated with the first and the second microphone.

Example 30 includes the subject matter of any of Examples 26-29, wherein the HMD is a virtual reality system to present audio and video to the user, the audio and video provided from the remote adaptive bitrate encoding system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system for adaptive bitrate encoding, the system comprising:
   a weight calculation circuit to calculate a first weight factor associated with a first microphone, and to calculate a second weight factor associated with a second microphone, each of the first and second weight factors based on position information and head angle information of a user relative to the first and second microphones, respectively;
   a bitrate selection circuit to select a first encoding bitrate based on the first weight factor, and to select a second encoding bitrate based on the second weight factor; and
   an adaptive bitrate encoder circuit to encode a first audio channel, which is associated with the first microphone, at the first encoding bitrate, and to encode a second audio channel, which is associated with the second microphone, at the second encoding bitrate.

2. The system of claim 1, further including a receiver circuit to receive the position information of the user and the head angle information of the user from a head mounted display (HMD) worn by the user.

3. The system of claim 1, further including a transmitter circuit to transmit the encoded first audio channel and the encoded second audio channel to an HMD worn by the user.

4. The system of claim 1, wherein the weight calculation circuit is to calculate a distance between the user and the first microphone based on the position information of the user, and the first weight factor is inverse exponentially proportional to a square of the distance.

5. The system of claim 1, wherein the weight calculation circuit is to calculate the first weight factor based on a directional sensitivity of a human ear associated with the head angle information of the user.

6. The system of 1, further including:
   a receiver circuit to receive the encoded first audio channel, and to receive the encoded second audio channel; and
   an adaptive bitrate decoder circuit to decode the encoded first audio channel at the first encoding bitrate, and to decode the encoded second audio channel at the second encoding bitrate.

7. The system of claim 6, further including an adaptive gain compensation circuit to scale the decoded first audio channel by a first gain factor, and to scale the decoded second audio channel by a second gain factor, the first and second gain factors based on the position information and the head angle information of the user.

8. The system of claim 7, further including an audio mixer to combine the scaled decoded first audio channel and the scaled decoded second audio channel to generate a stereo audio signal.

9. The system of claim 7, further including a head mounted display (HMD) wearable by the user, the stereo audio signal is played through speakers of the HMD, and further including at least one of:
   a measurement circuit to generate the position information and the head angle information of the user as the user moves the HMD; or
   a transmitter circuit to transmit the position information and the head angle information to the weight calculation circuit.

10. The system of claim 9, further including a virtual reality system to present audio and video to the user through the HMD, the audio and video provided from the adaptive bitrate encoder circuit.

11. At least one non-transitory computer readable medium comprising instructions that, when executed, cause one or more processors result to at least:
    calculate a first weight factor associated with a first microphone, and calculate a second weight factor associated with a second microphone, each of the first and second weight factors based on position information and head angle information of a user relative to the first and second microphones, respectively;
    select a first encoding bitrate based on the first weight factor, and select a second encoding bitrate based on the second weight factor; and
    encode a first audio channel, which is associated with the first microphone, at the first encoding bitrate, and encode a second audio channel, which is associated with the second microphone, at the second encoding bitrate.

12. The at least one computer readable medium of claim 11, wherein the instructions cause the one or more processors to receive the position information of the user and the head angle information of the user from a head mounted display (HMD) wearable by the user.

13. The at least one computer readable medium of claim 11, wherein the instructions cause the one or more processors to transmit the encoded first audio channel and the encoded second audio channel to an HMD wearable by the user.

14. The at least one computer readable medium of claim 11, wherein the instructions cause the one or more processors to calculate a distance between the user and the first microphone based on the position information of the user, and the first weight factor is inverse exponentially proportional to a square of the distance.

15. The at least one computer readable medium of claim 11, wherein the instructions cause the one or more processors to calculate the first weight factor based on a directional sensitivity of a human ear associated with the head angle information of the user.

16. At least one non-transitory computer readable medium comprising instructions that, when executed, cause one or more processors to at least:

provide a first weight factor associated with a first microphone, and provide a second weight factor associated with a second microphone, each of the first and second weight factors based on position information and head angle information of a user relative to the first and second microphones, respectively;

obtain a first audio channel encoded at a first bitrate, and obtain a second audio channel encoded at a second bitrate, the first and second bitrates selected based on the first and second weight factors; and decode the first audio channel at the first bitrate, and decode the second audio channel at the second bitrate.

17. The at least one computer readable medium of claim 16, wherein the instructions cause the one or more processors to scale the decoded first audio channel by a first gain factor, and scale the decoded second audio channel by a second gain factor, each of the first and second gain factors based on the position information and the head angle information of the user relative to the first and the second microphones, respectively.

18. The at least one computer readable medium of claim 17, wherein the instructions cause the one or more processors to combine the scaled decoded first audio channel and the scaled decoded second audio channel to generate a stereo audio signal.

19. The at least one computer readable medium of claim 18, wherein the instructions cause the one or more processors to at least one of:

play the stereo audio signal through a speaker of a head mounted display (HMD) wearable by the user;

generate the position information and the head angle information of the user as the user moves the HMD; or transmit the position information and the head angle information to a remote adaptive bitrate encoding system associated with the first and the second microphones.

20. The at least one computer readable medium of claim 19, wherein the HMD is a virtual reality system to present audio and video to the user, the audio and video provided from the remote adaptive bitrate encoding system.

* * * * *